United States Patent
Haas et al.

(10) Patent No.: US 10,295,144 B2
(45) Date of Patent: May 21, 2019

(54) MOLDED PART, IN PARTICULAR A DECORATIVE PART AND/OR CLADDING PART FOR A VEHICLE INTERIOR, CONFIGURED AS A MOLDED PART, AND METHOD FOR PRODUCING A MOLDED PART

(71) Applicant: NOVEM Car Interior Design GmbH, Vorbach (DE)

(72) Inventors: Mario Haas, Ahorntal (DE); Michael Wagner, Breitengussbach (DE); Markus Helldorfer, Bayreuth (DE)

(73) Assignee: Novem Car Interier Design GmbH, Vorbach (DE)

( * ) Notice: Subject to any disclaimer, the term of this patent is extended or adjusted under 35 U.S.C. 154(b) by 201 days.

(21) Appl. No.: 15/367,835

(22) Filed: Dec. 2, 2016

(65) Prior Publication Data

US 2017/0158122 A1  Jun. 8, 2017

(51) Int. Cl.
*F21V 3/04* (2018.01)
*B60Q 3/20* (2017.01)
*B60R 13/02* (2006.01)

(52) U.S. Cl.
CPC ............ *F21V 3/04* (2013.01); *B60Q 3/20* (2017.02); *B60R 13/02* (2013.01); *B60Q 2500/10* (2013.01); *B60R 2013/0287* (2013.01)

(58) Field of Classification Search
CPC ...... B60Q 3/20; B60Q 3500/10; B60R 13/02; B60R 2103/0287; F21V 3/04
USPC ................................... 362/509, 511
See application file for complete search history.

(56) References Cited

U.S. PATENT DOCUMENTS

| | | | |
|---|---|---|---|
| 2012/0320615 A1* | 12/2012 | Englert | B60Q 1/323 362/511 |
| 2014/0340920 A1* | 11/2014 | Bayersdorfer | B60Q 3/54 362/511 |
| 2015/0307033 A1* | 10/2015 | Preisler | B60R 13/02 362/488 |

FOREIGN PATENT DOCUMENTS

| DE | 19936982 | 3/2001 |
|---|---|---|
| DE | 10313068 | 12/2004 |
| DE | 102011016398 | 10/2012 |
| DE | 102012105412 | 12/2013 |

* cited by examiner

*Primary Examiner* — Laura K Tso
(74) *Attorney, Agent, or Firm* — Workman Nydegger

(57) ABSTRACT

The invention relates to a molded part, in particular a decorative part and/or cladding part that is configured as a molded part for a vehicle interior, comprising a decorative layer having a transparent lacquer layer, a carrier which is disposed on a rear side of the decorative layer, and a light source for illuminating and/or trans-illuminating the lacquer layer. The molded part according to the invention is characterized in that light which emanates from the light source is launched laterally directly and/or indirectly by way of at least one light conductor into the lacquer layer. The invention furthermore relates to a method for producing a molded part, in particular a molded part according to the invention.

23 Claims, 1 Drawing Sheet

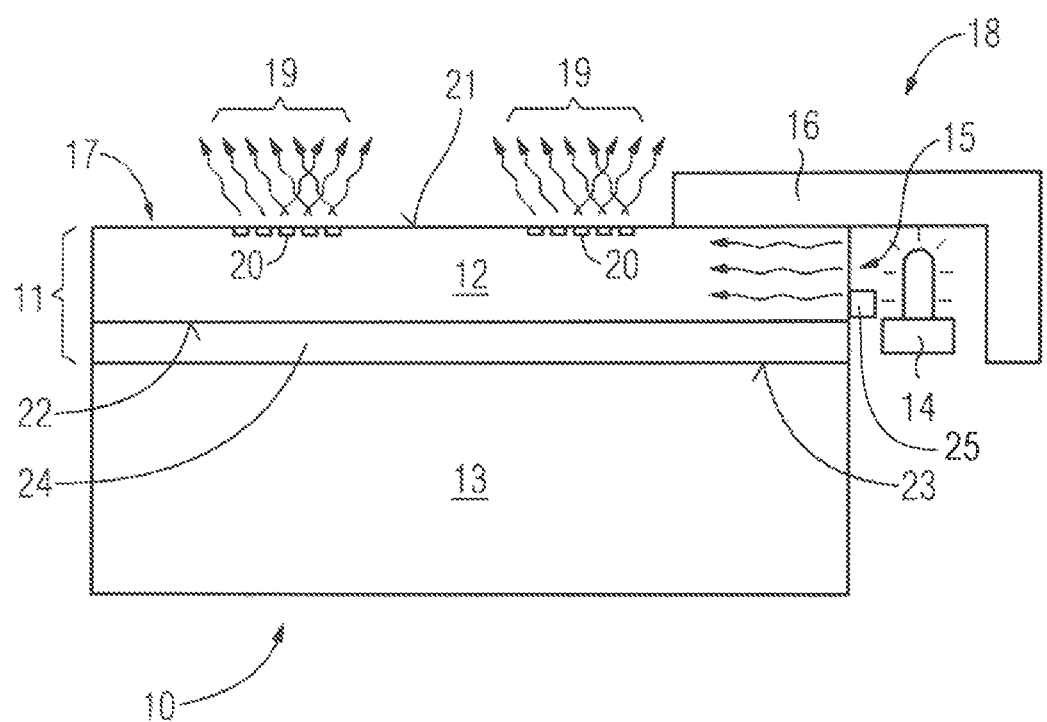

MOLDED PART, IN PARTICULAR A DECORATIVE PART AND/OR CLADDING PART FOR A VEHICLE INTERIOR, CONFIGURED AS A MOLDED PART, AND METHOD FOR PRODUCING A MOLDED PART

CROSS-REFERENCE TO RELATED APPLICATIONS

The present invention claims priority to German Patent Application No. DE 102015120876.8 entitled "Molded part, in particular a decorative part and/or cladding part for a vehicle interior, configured as a molded part, and method for producing a molded part," filed Dec. 2, 2015, the entire content of which is incorporated herein by reference.

BACKGROUND OF THE INVENTION

1. The Field of the Invention

The invention relates to a molded part, in particular a decorative part and/or cladding part that is configured as a molded part for a vehicle interior, and to a method for producing a molded part, in particular a molded part according to the invention.

2. Background and Relevant Art

A molded part of this type comprises a decorative layer having a transparent lacquer layer, a carrier which is disposed on a rear side of the decorative layer, and a light source for illuminating and/or trans-illuminating the lacquer layer. The decorative layer herein may at least substantially be composed of only the lacquer layer; in particular, the lacquer layer may cover directly a front side of the carrier such that the front side of the carrier to an observer is visible through the lacquer layer. However, it is also possible for the decorative layer, additionally to the lacquer layer, to comprise a decorative tier, wherein the lacquer layer is provided on a front side of the decorative layer, facing away from the rear side, and covers a front side of the decorative tier such that the front side of the decorative tier to an observer is visible through the lacquer layer. The carrier in this instance is disposed on the rear side of the decorative tier.

Molded parts for the vehicle interior are known per se. However, the requirements set for molded parts of this type are steadily increasing. In particular, new design potentials in terms of a diurnal or nocturnal visual ambience by illuminating the molded-part surface are desired. Utilization of the molded-part surface for illuminating functions and/or symbols is particularly desirable. In particular, light effects for highlighting or illustrating symbols or other designs on the molded-part surface are desired, so as to make said symbols or designs identifiable in particular in the case of poor or weak light conditions, and/or so as to visually enhance the molded part and thus the vehicle interior.

However, these molded parts often have the disadvantage that the decorative layer and/or the carrier have/has to be processed in a complex manner, for example in order to provide light passages such that the light may be directed from a light source, disposed on the molded-part rear side, to the molded-part surface. Furthermore, a system of light conductors often has to be provided in a complex manner, so as to guarantee optimum illumination of the molded-part surface.

The invention is based on the object of stating a new molded part, in particular a molded part in which the production effort is reduced and good illumination of the molded-part surface is simultaneously implemented. Furthermore, the invention is based on the object of stating a new method for producing such a molded part.

This object is achieved by the invention. The molded part according to the invention is characterized in that light which emanates from the light source is launched laterally directly and/or indirectly into the lacquer layer. In the case of indirect launching, launching is preferably performed by way of at least one light conductor.

In other words, the light source is disposed such that light which emanates from the light source is launched laterally directly and/or indirectly by way of at least one light conductor into the lacquer layer.

"Laterally" is understood to mean the launching of light into at least one portion of a lateral region of the lacquer layer, wherein a lateral region is to be understood to be the narrow lateral periphery of the lacquer layer between the front side and the rear side of the lacquer layer that is typically configured so as to be planar in particular. The rear side of the lacquer layer is preferably contiguous to a decorative feature to be illuminated, and the front side forms the surface of the molded part on a visible side that faces the observer. Thus, the light which emanates from the light source is preferably beamed into the lacquer layer in a manner parallel with the front side and/or the rear side of said lacquer layer. Herein, the lacquer layer may run so as to be substantially level. However, it is also possible for the lacquer layer to run in a curved manner; in this instance the light is guided through the lacquer layer like through a light conductor, following the curvature.

The light which is laterally launched into the lacquer layer illuminates that layer that is contiguous to the rear side of the lacquer layer, thus making the latter visible to an observer through the lacquer layer. This herein may be the front side of a decorative tier of the decorative layer, for example, or else the front side of the carrier.

In particular, the advantages of the invention lie in that there are no breakouts and light conductors required in the carrier and/or in an optionally present decorative tier, so as to direct the light to the molded-part front side, since the light is already launched at the molded-part front side.

According to one particularly preferred variant of an embodiment of the invention, it is provided that the light source is provided laterally on the lacquer layer, in particular is attached thereto. It is also possible for at least one light conductor, the one end of the latter terminating laterally on the lacquer layer and the other end thereof terminating at the light source, to be provided, wherein the light source is preferably provided on the rear side of the carrier, in particular is attached thereto.

According to one refinement of the invention, the molded part comprises a cover for the light source and/or the at least one light conductor, wherein the cover is disposed and configured in such a manner that the former covers the light source and/or the at least one light conductor on a molded-part front side and/or on molded-part lateral regions and/or on a molded-part rear side, preferably in such a manner that light from the light source and/or from the at least one light conductor may make its way outside exclusively by way of the lacquer layer.

Light-diffusing elements for launching light from the lacquer layer are preferably provided in and/or on the lacquer layer, in particular partially in provided regions of the lacquer layer, wherein the light-diffusing elements are provided on a front side of the lacquer layer, facing away from the carrier, and/or on a rear side of the lacquer layer, facing the carrier, and/or within the lacquer layer, preferably between the front side and the rear side of the lacquer layer.

It may be provided that the light-diffusing elements are formed by at least one further layer, wherein the further layer is provided on a rear side of the lacquer layer, facing the carrier. Preferably, the decorative layer is or comprises a decorative tier on the rear side of the lacquer layer, facing the carrier, wherein the decorative tier preferably is or comprises wood, in particular a wood veneer and/or a film and/or a woven fabric and/or a metal and/or a composite material, in particular carbon. This aforementioned further layer may in this case be a further lacquer layer which is applied to the decorative tier and is disposed between the lacquer layer and the decorative tier. Apart from configuring the light-diffusing elements, the further lacquer layer may serve for providing adhesion between the lacquer layer and the decorative tier. The further lacquer layer may be sprayed onto the decorative tier. However, it is also possible for the further lacquer layer to be printed on the decorative tier, thus forming a printed layer. Polyurethane may be considered as the material of the further lacquer layer, for example.

The further layer may also be a printed layer, preferably from lacquer and/or printing ink, which is applied to the aforementioned decorative tier and is disposed between the lacquer layer and the decorative tier. Apart from configuring the light-diffusing elements, the printed layer may serve for providing adhesion between the lacquer layer and the decorative tier. The further printed layer may be produced by printing on the decorative tier. The lacquer layer may have been produced subsequently thereto, for example by casting or spraying.

Alternatively or additionally, the further layer may also be provided on the front side of the lacquer layer, facing away from the carrier, so as to configure the light-diffusing elements. This further layer may be a further lacquer layer. The further lacquer layer may be sprayed on the lacquer layer. However, it is also possible for the further lacquer layer to be printed on the lacquer layer, thus forming a printed layer. Polyurethane may be considered as the material of the further lacquer layer, for example. The further layer may also be a printed layer, preferably from lacquer and/or printing ink. The further printed layer may be produced by printing on the lacquer layer.

BRIEF SUMMARY OF THE INVENTION

The lacquer or the printing ink of the variants of the further layer that have been described above may be applied to the decorative layer in a planar manner. However, it is also possible for the lacquer or the printing ink to be applied only partially, for example in the form of symbols to be illustrated. Also, the lacquer and/or printing ink of the further layer may be multi-coloured and/or mono-coloured and/or transparent.

It may be furthermore provided that the light-diffusing elements are formed by subtraction from the lacquer layer, preferably on the front side of the lacquer layer, facing away from the carrier, wherein the subtraction is preferably formed by means of abrading, brushing, engraving, mortising, and/or subtracting by laser, and/or that the light-diffusing elements are formed by moldings on the front side of the lacquer layer, facing away from the carrier, wherein the moldings are preferably incorporated into the lacquer layer during the application of the lacquer layer.

DETAILED DESCRIPTION OF THE INVENTION

According to one expedient refinement of the invention, the decorative layer is or comprises a decorative tier on the rear side of the lacquer layer, facing the carrier, wherein the decorative tier preferably is or comprises wood, in particular a wood veneer and/or a film and/or a woven fabric and/or a metal and/or a composite material, in particular carbon.

The lacquer layer may be formed from PMMA and/or polyurethane and/or polyurea and/or polyaspartics and/or polyester, or may comprise one or a plurality of these materials. The lacquer layer may also be dyed and/or provided with colour particles. Alternatively or additionally, the lacquer layer on the front side thereof, facing away from the carrier, may be configured so as to be lustrous or matted, wherein a matt lacquer is provided in particular.

The carrier may be formed from plastic and/or metal, or may comprise plastic and/or metal, wherein the carrier front side is preferably provided as decoration, in particular in the instance where there is no additional decorative tier provided in the decorative layer, that is to say when the lacquer layer forms the decorative layer and the lacquer layer thus is directly contiguous to the carrier.

The method according to the invention for producing a molded part, in particular a molded part according to the invention, comprises the following steps: providing the carrier, placing the carrier in a coating tool, applying the lacquer layer, preferably to the carrier, in particular to the carrier front side, in the coating tool providing a light source on the molded part.

The method according to the invention is characterized in that the light source is disposed such that light which emanates from the light source is launched laterally directly and/or indirectly by way of at least one light conductor into the lacquer layer. In particular, the light source to this end is disposed so as to be laterally contiguous to the lacquer layer (in other words, so as to be contiguous to lateral regions of the lacquer layer), preferably in lateral regions of the molded part. It may also be provided that at least one light conductor by way of one end thereof terminates laterally on the lacquer layer, the light source in this instance being disposed at the other end of said light conductor, preferably on the rear side of the carrier.

The decorative layer may comprise a decorative tier. In this case the lacquer layer is not applied directly to the carrier but to the decorative tier which is already provided on the carrier. It is also possible that the lacquer layer is not directly applied to the decorative tier, but to an additionally provided further layer, as described below.

One refinement of the method provides that light-diffusing elements for launching light in and/or on the lacquer layer are incorporated and/or applied, preferably in a partial manner in provided regions of the lacquer layer.

For example, the light-diffusing elements may be incorporated and/or applied in that at least one further layer, in particular at least one further lacquer layer and/or a printed layer, preferably from printing ink, is provided to on the front side of the lacquer layer, facing away from the carrier, and/or to on a rear side of the lacquer layer, facing the carrier.

Preferably, the decorative layer is or comprises a decorative tier on the rear side of the lacquer layer, facing the carrier, wherein the decorative tier preferably is or comprises wood, in particular a wood veneer and/or a film and/or a woven fabric and/or a metal and/or a composite material, in particular carbon. This aforementioned further layer may in this case be a further lacquer layer which is applied to the decorative tier and is disposed between the lacquer layer and the decorative tier. Apart from configuring the light-diffusing elements, the further lacquer layer may serve for providing adhesion between the lacquer layer and the decorative tier. The further lacquer layer may be sprayed onto the decorative tier. However, it is also possible for the further lacquer layer to be printed on the decorative tier, thus forming a printed layer. Polyurethane may be considered as the material of the further lacquer layer, for example.

The further layer may also be a printed layer, preferably from lacquer and/or printing ink, which is applied to the aforementioned decorative tier and is disposed between the lacquer layer and the decorative tier. Apart from configuring the light-diffusing elements, the printed layer may serve for providing adhesion between the lacquer layer and the decorative tier. The further printed layer may be produced by printing on the decorative tier. The lacquer layer may have been produced subsequently thereto, for example by casting or spraying.

Alternatively or additionally, the further layer may also be provided on the front side of the lacquer layer, facing away from the carrier, so as to configure the light-diffusing elements. This further layer may be a further lacquer layer. The further lacquer layer may be sprayed on the lacquer layer. However, it is also possible for the further lacquer layer to be printed on the lacquer layer, thus forming a printed layer. Polyurethane may be considered as the material of the further lacquer layer, for example. The further layer may also be a printed layer, preferably from lacquer and/or printing ink. The further printed layer may be produced by printing on the lacquer layer.

It is also possible for the light-diffusing elements to be incorporated and/or applied by material subtraction on the lacquer layer, preferably on the front side of the lacquer layer, facing away from the carrier, wherein subtraction is preferably performed by means of abrading and/or brushing and/or engraving and/or mortising and/or subtracting by laser.

A further example of the incorporation and/or application of the light-diffusing elements is the provision of moldings on the front side of the lacquer layer, facing away from the carrier, wherein the moldings are preferably incorporated into the lacquer layer during the application of the lacquer layer, in particular in that an internal surface of the coating tool is configured such that said surface has a counterpart-shape to the envisaged moldings.

The invention will be explained in more detail hereunder by means of the description of exemplary embodiments and with reference to the appended schematic drawing, also with a view to further features and advantages. Herein, the FIGURE in a schematic cross-sectional illustration shows an exemplary embodiment of a molded part according to the invention.

DETAILED DESCRIPTION OF THE PREFERRED EMBODIMENTS

The FIGURE shows a decorative part and/or cladding part, configured according to the invention as a molded part 10, for a vehicle interior, comprising a decorative layer 11 having a transparent lacquer layer 12, for example from PMMA, and a film as a decorative tier 24 on the rear side 22 of the lacquer layer 12, facing the carrier 13. A carrier 13 which is formed from plastic is disposed on the rear side of the decorative layer 11. The molded part 10 furthermore comprises a light source 14 for illuminating and trans-illuminating the lacquer layer 12.

Launching the light which emanates from the light source 14 is provided so as to be laterally into the lacquer layer 12, at the lateral region 15 of the lacquer layer 12. To this end, the light source 14 is laterally disposed on the lacquer layer 12. In the example shown, the launching of light is performed laterally, directly into the lacquer layer 12. However, an indirect launching of light by way of at least one light conductor 25, which is disposed between light source 14 and lateral region 15 of the lacquer layer 12 is also possible.

The molded part 10 comprises a cover 16 for the light source 14, wherein the cover 16 covers the light source 14 in such a manner that the latter is covered on the molded-part front side 17 and on the molded-part lateral regions 18 such that, to an observer of the molded part 10, light which emanates from the light source 14 is only visible when the latter is guided by way of the lacquer layer 12.

Light-diffusing elements 20 for launching light from the lacquer layer 12 are provided in envisaged regions 19 of the lacquer layer 12, wherein the light-diffusing elements 20 are provided on the front side 21 of the lacquer layer 12, facing away from the carrier 13. Additionally or alternatively, light-diffusing elements may also be provided on the rear side (not illustrated) of the lacquer layer 12, facing the carrier, that is to say between the lacquer layer 12 and the decorative tier 24.

The light-diffusing elements 20 illustrated may be formed by subtraction on the front side 21 of the lacquer layer 12, facing away from the carrier 13, wherein the subtraction is preferably formed by means of abrading, brushing, engraving, mortising, or subtracting by laser. Alternatively, the light-diffusing elements 20 may also be applied by applying a further layer, for example a further lacquer layer or a printed layer. This method is not only suitable for the front side 21 of the lacquer layer 12, but also for the rear side 22 of the lacquer layer 12.

LIST OF REFERENCES

10 Molded part
11 Decorative Layer
12 Lacquer Layer
13 Carrier
14 Light source
15 Lateral region of the lacquer layer 12
16 Cover
17 Molded-part front side
18 Molded-part lateral region
19 Region
20 Light-diffusing elements
21 Front side of lacquer layer 12
22 Rear side of lacquer layer 12
23 Carrier front side
24 Decorative tier
25 Light conductor

We claim:

1. A molded part for a vehicle interior, comprising:
a decorative layer having a transparent lacquer layer,
a carrier which is disposed on a rear side of the decorative layer, and
a light source for illuminating the lacquer layer,
wherein:
the light source is provided laterally in relation to the lacquer layer, and
light that emanates from the light source is launched laterally into the lacquer layer.

2. The molded part according to claim 1, further comprising:
at least one light conductor, wherein a first end of the at least one light conductor terminates laterally on the lacquer layer and a second end of the at least one light conductor terminates at the light source.

3. The molded part according to claim 1, further comprising:
a cover for the light source, wherein the cover is disposed and configured in such a manner that the cover covers the light source.

4. The molded part according to claim 1, wherein:
light-diffusing elements for launching light from the lacquer layer are provided in the lacquer layer.

5. The molded part according to claim 4, wherein:
the light-diffusing elements are formed by at least one further layer, wherein the further layer is provided on a front-side of the lacquer layer, facing away from the carrier, on a rear side of the lacquer layer, facing the carrier.

6. The molded part according to claim 4, wherein:
the light-diffusing elements are formed by subtraction from the lacquer layer on a front side of the lacquer layer, facing away from the carrier,
or
the light-diffusing elements are formed by moldings on the front side of the lacquer layer, facing away from the carrier, wherein the moldings are incorporated into the lacquer layer during the application of the lacquer layer.

7. The molded part according to claim 1, wherein:
the decorative layer comprises a decorative tier on the rear side of the lacquer layer, facing the carrier; and
the decorative tier is formed from a wood or composite material.

8. The molded part according to claim 1, wherein:
the lacquer layer is formed from PMMA, polyurethane, polyurea, polyaspartics, polyester, or a combination of these materials.

9. The molded part according to claim 1, wherein:
the lacquer layer is dyed, or
the front side of the lacquer layer, facing away from the carrier, is configured so as to be lustrous or matted.

10. The molded part according to claim 1, wherein:
the carrier is formed from plastic or metal, and a front side of the carrier is provided as decoration.

11. A method for producing a molded part, the method comprising the following steps:
providing a carrier, placing the carrier in a coating tool;
applying a lacquer layer in the coating tool; and
providing a light source that disposed laterally in relation to the lacquer layer,
wherein the light source is disposed such that light which emanates from the light source is launched into the lacquer layer.

12. The method according to claim 11, wherein:
light-diffusing elements for launching light in or on the lacquer layer are incorporated or applied in a at least one further layer positioned on a front side of the lacquer layer, facing away from the carrier, or on a rear side of the lacquer layer, facing the carrier.

13. The method according to claim 11, wherein:
light-diffusing elements for launching light in or on the lacquer layer are incorporated or applied by material subtraction on the front side of the lacquer layer, facing away from the carrier.

14. The method according to claim 11, wherein:
light-diffusing elements for launching light in or on the lacquer layer are incorporated or applied by moldings on the front side of the lacquer layer, facing away from the carrier.

15. The method according to claim 14, wherein:
the moldings are incorporated into the lacquer layer during the application of the lacquer layer in that an internal surface of the coating tool is configured such that the internal surface has a counterpart-shape to the envisaged moldings.

16. The molded part according to claim 1, wherein:
the decorative layer comprises a decorative tier on the rear side of the lacquer layer, facing the carrier; and
the decorative tier is formed from film or metal.

17. The molded part according to claim 2, further comprising:
a cover for the light source, wherein the cover is configured to cover the light source and the at least one light conductor.

18. The method according to claim 11, wherein:
the light source is disposed such that light that emanates from the light source is launched laterally directly into the lacquer layer.

19. The method according to claim 11, wherein:
the light source is disposed such that light which emanates from the light source is launched indirectly by way of at least one light conductor into the lacquer layer.

20. A molded part for a vehicle interior, comprising:
a decorative layer having a transparent lacquer layer;
a carrier which is disposed on a rear side of the decorative layer; and
a light source for illuminating the lacquer layer,
wherein:
light that emanates from the light source is launched laterally into the lacquer layer, and
the light-diffusing elements are formed by subtraction from the lacquer layer on a front side of the lacquer layer, facing away from the carrier.

21. A molded part for a vehicle interior, comprising:
a decorative layer having a transparent lacquer layer;
a carrier which is disposed on a rear side of the decorative layer; and
a light source for illuminating the lacquer layer,
wherein:
light that emanates from the light source is launched laterally into the lacquer layer, and
the light-diffusing elements are formed by moldings on the front side of the lacquer layer, facing away from the carrier, wherein the moldings are incorporated into the lacquer layer during the application of the lacquer layer.

22. A method for producing a molded part, the method comprising the following steps:
providing a carrier, placing the carrier in a coating tool;
applying a lacquer layer in the coating tool;
providing a light source,
wherein the light source is disposed such that light which emanates from the light source is launched into the lacquer layer; and
incorporating light-diffusing elements for launching light in and on the lacquer layer by material subtraction on the front side of the lacquer layer, facing away for the carrier.

23. A method for producing a molded part, the method comprising the following steps:
providing a carrier, placing the carrier in a coating tool;
applying a lacquer layer in the coating tool;
providing a light source,
wherein the light source is disposed such that light which emanates from the light source is launched into the lacquer layer; and incorporating light-diffusing elements for launching light in and on the lacquer layer by applying moldings on the front side of the lacquer layer, facing away from the carrier.

* * * * *